Feb. 26, 1952   W. D. EAKIN   2,587,448
ENERGY-ABSORBING DECELERATION
APPARATUS FOR PARACHUTE LOADS
Filed Feb. 6, 1951   3 Sheets-Sheet 2

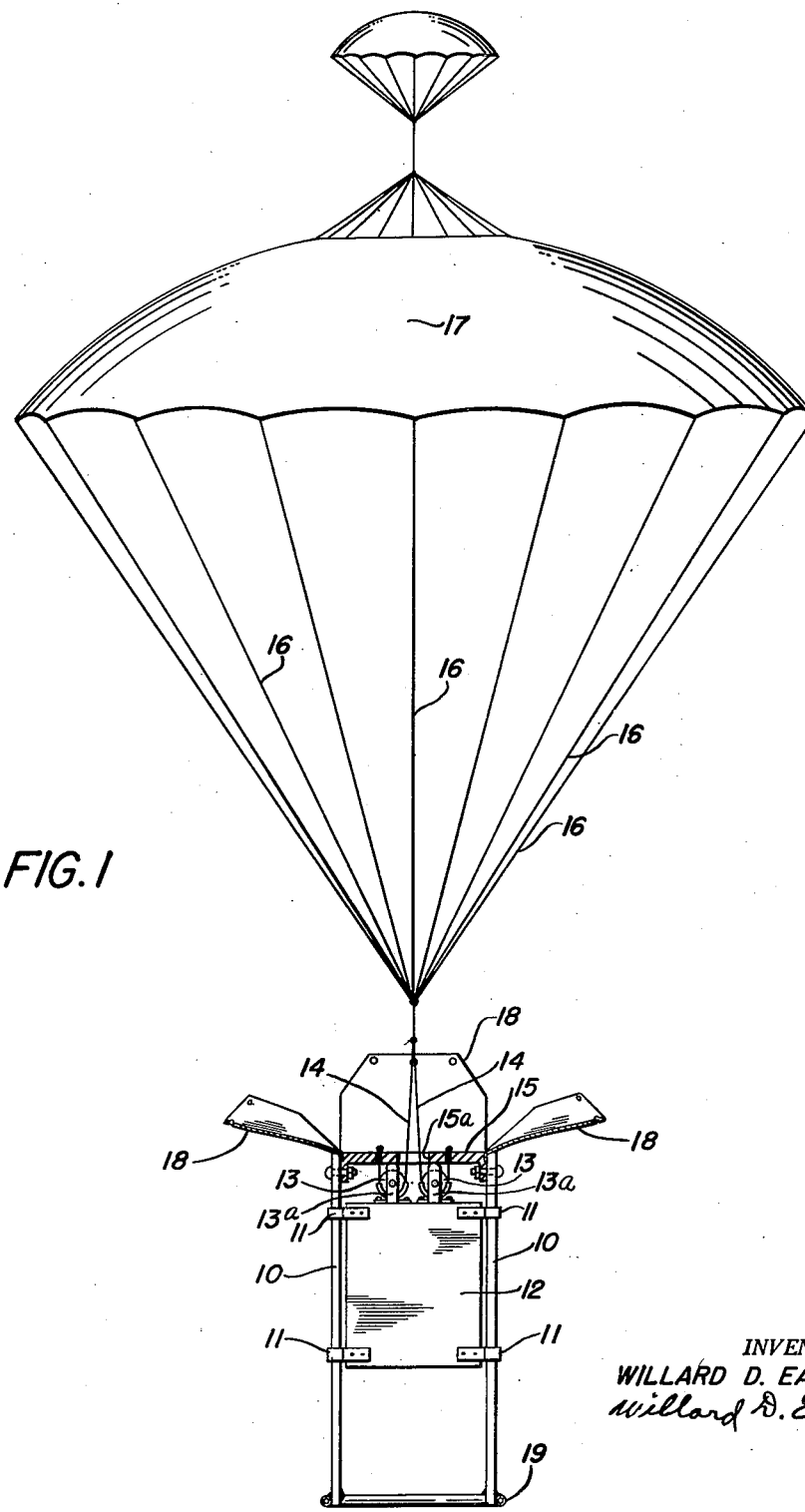

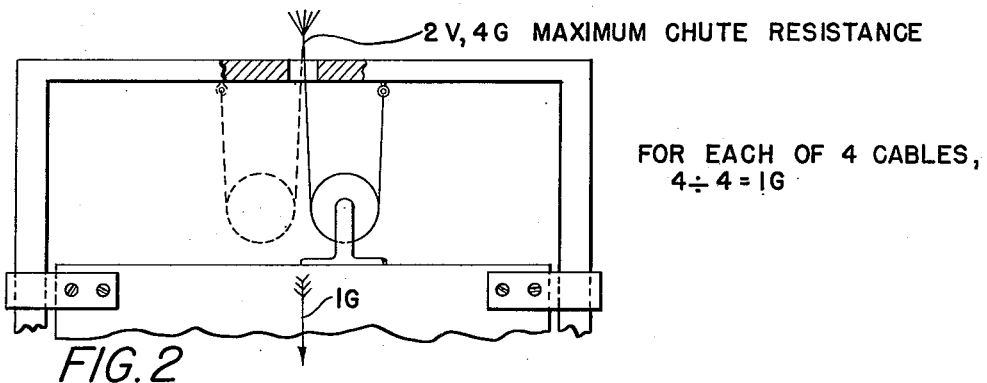

FIG. 2

2 V, 4 G MAXIMUM CHUTE RESISTANCE

FOR EACH OF 4 CABLES,
$4 \div 4 = 1G$

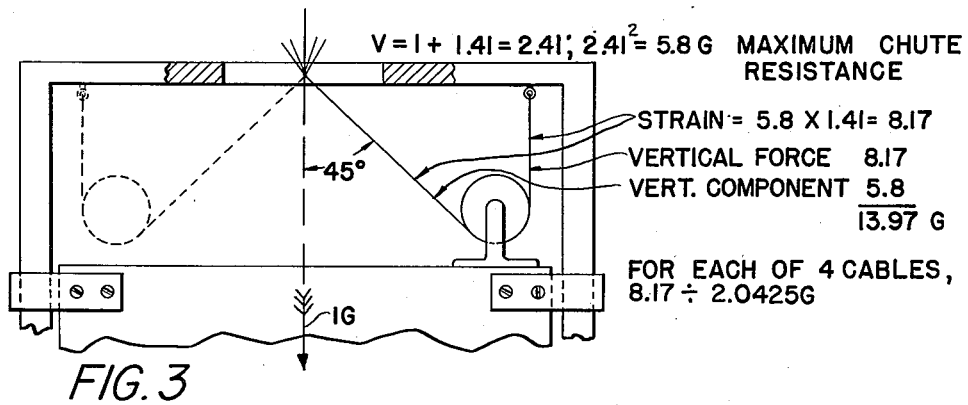

FIG. 3

$V = 1 + 1.41 = 2.41$; $2.41^2 = 5.8\,G$ MAXIMUM CHUTE RESISTANCE

STRAIN = $5.8 \times 1.41 = 8.17$
VERTICAL FORCE  8.17
VERT. COMPONENT  5.8
          $\overline{13.97}$ G FOR EACH OF 4 CABLES,
$8.17 \div 2.0425\,G$

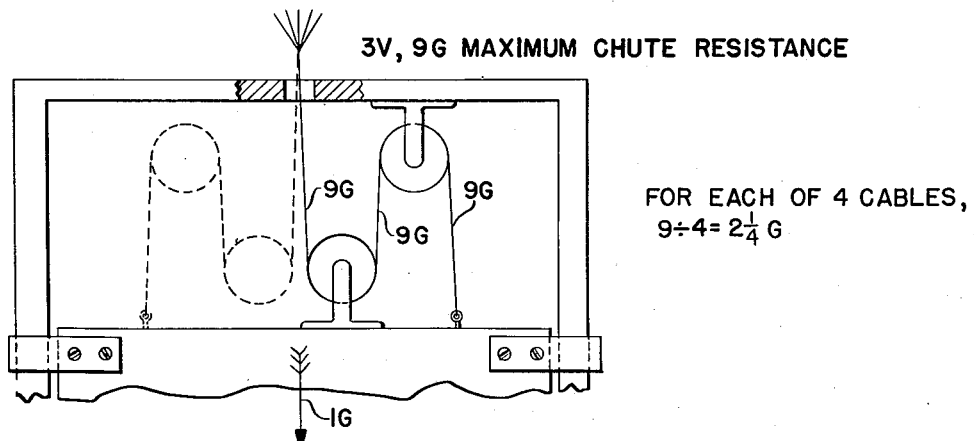

FIG. 4

3V, 9G MAXIMUM CHUTE RESISTANCE

FOR EACH OF 4 CABLES,
$9 \div 4 = 2\tfrac{1}{4}\,G$

*INVENTOR.*
WILLARD D. EAKIN
*Willard D. Eakin*

*INVENTOR.*
WILLARD D. EAKIN
*Willard D. Eakin*

Patented Feb. 26, 1952

2,587,448

UNITED STATES PATENT OFFICE 2,587,448

ENERGY-ABSORBING DECELERATION APPARATUS FOR PARACHUTE LOADS

Willard D. Eakin, Akron, Ohio

Application February 6, 1951, Serial No. 209,566

6 Claims. (Cl. 244—138)

This invention relates to apparatus for decelerating the load of a parachute or other aircraft as it closely approaches the ground.

Its chief objects are to provide apparatus adapted to employ the kinetic energy of the load itself for effecting the deceleration; to provide apparatus adapted to effect the deceleration automatically and in an accurately predetermined range of movement close to the ground; to provide apparatus of which the design and proportions can be the same for all parachutes, regardless of size, if loaded for the same ultimate or "terminal" velocity; to provide the same range of decelerating movement for loads of all sizes having parachute area for the same ultimate velocity, without change of design or proportions of the apparatus; to provide apparatus adapted to apply a strong decelerating force, and consequently do a large part of the decelerating job, in an early part of the range of decelerating movement, with a decrease of deceleration as ground contact of the load is more closely approached; to avoid rebound as to the load and as to all parts of the apparatus; to provide for completing the decelerating job and thus bringing the load almost to a stop before it contacts the ground; to provide apparatus adapted to do the decelerative job without excessive strain upon the supporting lines; to provide improved apparatus for decelerating and landing the load while it has high horizontal speed; and to provide simple, inexpensive, compact and durable apparatus having some or all of the foregoing advantages.

Of the accompanying drawings:

Fig. 1 is an elevation, with parts sectioned, of a parachute and, attached thereto, load landing apparatus embodying the invention.

Fig. 2 is a diagram of parts of the apparatus as adapted for a moderate rate of deceleration.

Figs. 3, 4 and 5 are similar diagrams representing modifications designed for respective decelerating effects.

Figure 5:
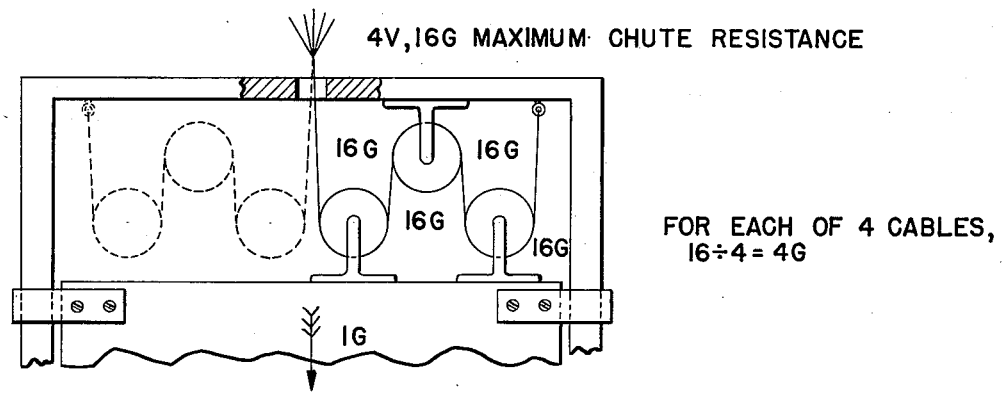

In its simplest form the apparatus comprises (Figs. 1 and 2) a ground-contacting frame having vertical guide-posts 10, 10 on which are slidably mounted guide brackets 11, 11 fastened to means such as a box 12 for containing or otherwise supporting cargo or personnel or both.

Mounted on the top of the box are, preferably, a plurality of pulleys 13, 13, which preferably have arcuate line-guides or guards as shown.

A line 14 for each pulley extends under the pulley and has one end attached to a plate or spider 15 which is the upper end member of the frame. The other end of each line 14 extends through a central hole 15a in the plate and is connected to the shroud lines 16, 16 of the parachute 17. The arrangement thus has characteristics of a block-and-tackle.

The plate or spider 15 can serve as the base of a parachute pack comprising also fabric cover sections 18, 18.

Preferably the frame comprises a ring 19 secured to the posts 10 to serve as a strengthening brace and also as a ground-contacting foot of wide span in all directions, especially if, as is contemplated in Fig. 1, the frame has only two of the guide-posts 10.

The brackets 13a, 13a in which the pulleys 13 are mounted project upward past the pulleys and their upper ends are adapted to abut the lower face of the plate or spider as a stop for limiting upward movement of the box 12 in relation to the frame.

At the time of launching the box preferably is in or near its uppermost position in relation to the frame, where it can be temporarily held, if desired, by friction of the guides on the posts or by suitable break-cords (not shown).

Upon opening of the chute and until ground contact is made, and in fact until deceleration is completed, the pull of the chute applies an upward force to the box and a downward force to the frame. This continued downward force on the frame prevents rebound of the frame from its impact with the ground, especially because at that time the stopping of the frame by the ground results in an instantaneous increase of the downward force exerted upon the frame as an incident of the deceleration of the box by the increased resistance of the speeded-up parachute.

At that time the speed of the parachute is doubled and its resistance consequently is quadrupled except as elasticity of the lines may "smooth out the curve" of the deceleration of the box, by preventing the full development of the theoretical from one-to-four increase of resistance that would occur if the lines had no elasticity.

Suitable elasticity in the lines has the desirable result of distributing the decelerating job more evenly over the range of decelerating movement of the box. Preloaded shock-absorber cord can be used for the pulley lines if desired. The recoil of elastic lines of proper modulus will be completely or substantially killed off or "absorbed," before the box hits the ground, by the dash-pot effect of the speeded up chute. Alternatively the elasticity of lines can be such that their recoil continues to be a parachute-accelerating and box-decelerating factor until the box hits the ground or, with suitable stops for the lines (not shown) until the box is brought to a full stop and held suspended, a little above the ground, by the no-longer-running pulley lines.

Calculations indicate that the box can be sufficiently decelerated without excessively long posts 10 for the frame, and without the lines being subjected to excessive strain at any time, even if non-elastic.

Fig. 2 contemplates the use of four pulley cables, two of them, and their pulleys, being directly behind those that are shown, and thus, as indicated by lettering on the drawing, the strain, in each of the four cables, could never be more than the full weight of the box (1G), which is four times the terminal-velocity-strain of the individual line, and no greater than the strain to which it is subjected upon the opening of the chute, especially if the assembly is launched from a plane going at high speed.

A strain even that great could occur only if the lines were completely inelastic, and even then the strain, because of the dash-pot yielding of the parachute, would, as above indicated, not be greater than 1G per cable.

Assuming inelastic cables in Fig. 2, the decelerating force would be distributed over the range of decelerating movement in a compound geometric ratio, with the greatest deceleration in the first part of that movement, but a close approximation of the length of frame-leg guide posts that would be required can be arrived at by assuming that the average speed of the parachute for the whole of the box-decelerating range of movement, would be not very far from half of its maximum accelerated speed at the beginning of that movement. Moreover, a slight change of the length of the legs would be sufficient to compensate for any variation of the calculation from actuality.

Such a calculation for Fig. 2 is as follows:

The parachute having a terminal-velocity V and having a mechanical advantage of two-to-one, with a resulting strain of 1G in each of the eight (8) vertical reaches of cable, the initial, maximum, net decelerating force on the box would be 8G minus 1G (the constantly acting weight of the box), which is 7G net.

Average net decelerating force=

$$\frac{7G+0}{2}=3\tfrac{1}{2}G$$

Kinetic energy in load, for an assumed 24 ft. per second velocity, is equal to 1G acting through $$\frac{24}{2}=12 \text{ feet}$$

this being the total decelerating job (work) to be done.

1G acting through 12 ft.=3½G acting through $$12/3.5=\frac{24}{7}=3\tfrac{3}{7} \text{ feet}$$

(Approximate range of decelerating movement).

Like calculations gave a result of $^{12}/_{13}$ ft. for the three-to-one mechanical advantage represented in Fig. 4 and a result of 4½ inches for the four-to-one mechanical advantage represented in Fig. 5. Both of those assemblies, assuming inelastic lines, would provide a deceleration too abrupt, at least for some types of loads.

Fig. 3 shows an arrangement adapted to provide a shorter range of decelerating movement than is provided by the two-to-one ratio of Fig. 2, but still not too short for some types of load and with the advantage of distributing the decelerating job evenly over the range of decelerating movement, even with inelastic lines.

Taking into account the fact that, with the assumed 45 degree angle between the oblique reach of cable and the vertical middle-line, the parachute has on that account alone a mechanical advantage of 1.41 to 1, the 1.41 being the secant of 45 degrees, the parachute correspondingly is initially compelled to move at the rate of 1.41V for the oblique reach of cable plus 1V for the vertical reach, which means that it is instantly stepped up to a speed of 2.41V, the square of which, representing its increased resistance, is 5.8G.

Using that value for a calculation like that made above for Fig. 2 gives $1^{11}/_{13}$ feet as the approximate range of the decelerating movement of the box.

During that movement, however, the angle between the oblique reach of cable and the vertical middle-line of course increases, approaching 90 degrees, with increase of the secant of the changing angle, and with corresponding further increase in the ratio of the parachute's speed to the speed of the box.

During the same time the speed of the box is being reduced and these two factors, one increasing and the other diminishing, have a net result of making the decelerating force more nearly constant than it is in the case of Fig. 2. By proper choice of the starting angle, in accordance with the desired range of decelerating movement, a desirable "straightening of the curve" of the decelerating force can be had.

Figure 6:
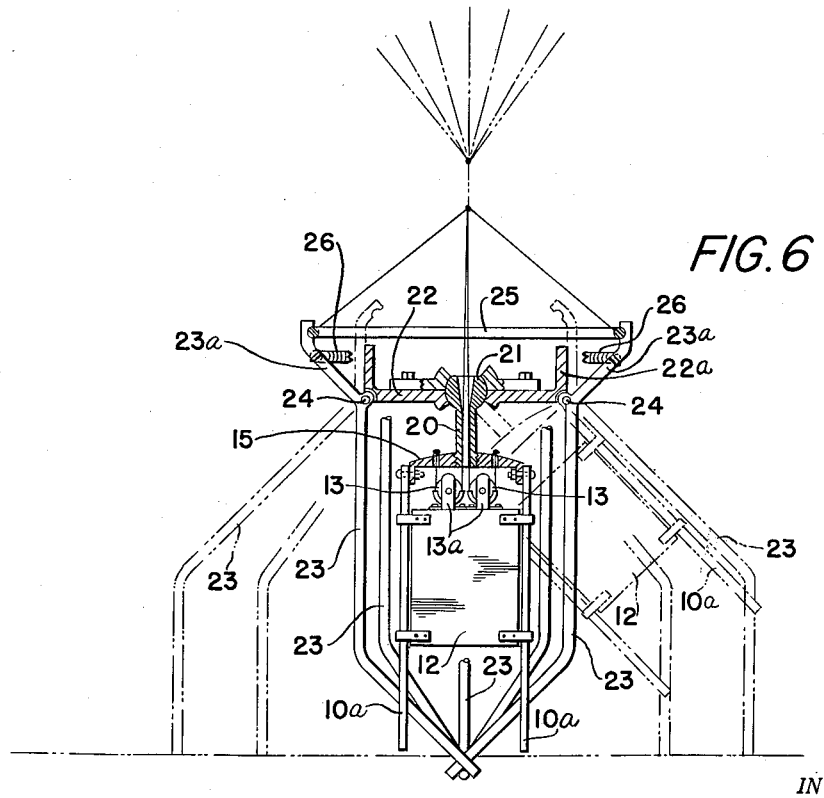
Fig. 6 is an elevation, with parts sectioned and with parts shown in both full-line and dotted-line positions, of an embodiment of the invention adapted for safe landing of a load while it has high horizontal as well as vertical velocity.

In Fig. 6 the central assembly has substantially the same structure and mode of operation as that shown in Fig. 1 except that it is formed with an upwardly projecting supporting neck 20 which is connected by a ball-and-socket joint at 21 to the upper end plate or spider 22 of a folding-and-extending, ground-contacting structure comprising a circumferentially spaced set of ground-contacting legs 23, 23 hinged to the top plate 22 as at 24, 24.

The pulley lines 14, 14 extend through a passage-way in the joint 21, neck 20 and plate 22 as shown.

Each leg 23 has an angularly disposed portion 23ª projecting upward beyond its hinge 24 and formed with a latch recess near its upper end. These recesses receive and appropriately retain a latching ring 25 which holds the legs in their storage positions, in which they are shown in full lines, against the force of a circumferential series of pull springs, such as the springs 26, 26, which connect the upward extensions of the legs, above their hinge axes, and thus constantly urge the legs 23 outward.

For dislodging the latching ring 25 upon opening of the chute the ring is connected to the shroud lines by lines 27, 27 of such relative length as to become taut and dislodge the ring 25 before the pulley lines 14 have become taut or at least before they have snugged the pulley brackets 13ª against the inner-frame plate 15ᵇ.

Upon such dislodging of the latching ring 25 the springs 26 swing the legs 23 outward to their dotted line positions, in which positions they are stopped by contact of their upward extensions 23ª with a stop-flange 22ª on the plate 22.

Preferably the legs 23 and guide posts, 10ª, 10ª, are of such relative lengths that the latter do not come into contact with the ground, on level terrain, at least.

The set of legs 23 preferably have such wide spread that at all moderate ground speeds the spider-like structure will promptly assume a position of stable footing, and the inner, load-supporting structure is free to swing toward the dotted line position while decelerating the box, instead of suddenly imposing upon the spider-like outer structure as a tilting force the full horizontal force of the inner structure, as would be the case if the two structures were rigidly connected instead of hingedly connected, as by the ball-and-socket joint.

Also the springs 26 provide a cushioning of those of the legs 23 that are on the forward side of the assembly in such a way that, without lifting the legs on the rearward side, they have a vaulting-pole action during and because of which they strongly add to the decelerating force applied to the box.

Various modifications are possible without sacrifice of all of the advantages set out in the above statement of objects and without departure from the scope of the invention as defined in the appended claims.

I claim:

1. Energy-absorbing deceleration apparatus for a parachute load, said apparatus comprising, in a gravity-impelled unitary assembly, a ground-contacting structure to be stopped by its contact with the ground and thus to sustain load-decelerating force in series with the ground, an air-displacing resistance member, a load-supporting member which, with the load, is to be decelerated, and is mounted for continued downward load-decelerating movement after said ground-contacting structure has been stopped by its contact with the ground, and force-transmitting means connecting said ground-contacting structure, said load-supporting member and said resistance member and actuated by the said continued downward movement of said load-supporting member in relation to said ground contacting structure for transmitting kinetic energy of the load, through said load-supporting member, to said resistance member as an impelling force to move the latter in relation to said load-supporting member, for increasing the air resistance of said resistance member, with the resulting increase of its resistance sustained by said ground-contacting structure, in series with the ground, as a load-decelerating force.

2. Apparatus as defined in claim 1 in which the air-resistance member is a parachute and in which the defined force-transmitting means is a speed-ratio device for increasing the downward speed of the parachute.

3. Apparatus as defined in claim 1 in which the air-resistance member is a parachute and in which the defined force-transmitting means is a speed-ratio line-and-pulley device for increasing the downward speed of the parachute.

4. Apparatus as defined in claim 1 in which the defined force-transmitting means is a changing-mechanical-advantage speed-ratio device.

5. Apparatus as defined in claim 1 in which the defined force-transmitting means is a changing-mechanical-advantage speed-ratio device by reason of its being a line-and-pulley device having a reach of its line varyingly oblique to the direction of the net decelerating force applied to the load.

6. A device for safely lowering a load through the air to the ground comprising a ground contacting structure, a load support movable relative to the ground contacting structure, mechanical means connected to the load support and to the ground contacting structure, air resistance means, and means connected to said mechanical means and to said air resistance means, said mechanical means comprising structure producing a mechanical advantage whereby movement of the load-support relative to the ground contacting structure increases the resistance of the air resistance means.

WILLARD D. EAKIN.

REFERENCES CITED

The following references are of record in the file of this patent:

UNITED STATES PATENTS

| Number | Name | Date |
|---|---|---|
| 2,077,178 | Mirel | Apr. 13, 1937 |
| 2,477,907 | Smith | Aug. 2, 1949 |
| 2,555,352 | Lowell | June 5, 1951 |

FOREIGN PATENTS

| Number | Country | Date |
|---|---|---|
| 604,938 | Great Britain | July 13, 1948 |